United States Patent [19]
Cheng et al.

[11] Patent Number: 5,820,151
[45] Date of Patent: Oct. 13, 1998

[54] FRONT WHEEL DRIVING MECHANISM FOR BICYCLES

[76] Inventors: Chin Ming Cheng, No. 56-1, Teng-Shan Street, Ku-Shan District, Kaohsiung; Wei Ling Ou, No. 168, Fu-Hsing Hsin Village, Tso-Ying District, Kaohsiung, both of Taiwan

[21] Appl. No.: 852,499

[22] Filed: May 7, 1997

[51] Int. Cl.$^6$ ....................................... B62M 1/00
[52] U.S. Cl. .......................................... 280/233; 280/234
[58] Field of Search ................................ 280/233, 234, 280/230, 261, 224, 249, 242.1, 220, 250, 221, 223

[56] References Cited

U.S. PATENT DOCUMENTS

| | | | |
|---|---|---|---|
| 704,284 | 7/1902 | Winner | 280/233 |
| 2,533,728 | 12/1950 | Gedat | 280/233 |
| 4,773,662 | 9/1988 | Phillips | 280/233 |

*Primary Examiner*—Robert J. Oberleitner
*Assistant Examiner*—C. T. Bartz
*Attorney, Agent, or Firm*—Bacon & Thomas

[57] ABSTRACT

A bicycle front wheel frame assembly includes a horizontal tubular member mounted in front of a head tube, a vertical rod assembly mounted between the tubular member and a front fork, and a horizontal rod assembly mounted between the tubular member and the head tube. Both lengths of the vertical rod assembly and the horizontal rod assembly are adjustable so as to adjust distances between the handles and the cyclist.

11 Claims, 6 Drawing Sheets

FRONT WHEEL DRIVING MECHANISM FOR BICYCLES

BACKGROUND OF THE INVENTION

1. Field of the Invention

The present invention relates to a bicycle front wheel frame assembly which may be adjusted to suit cyclists of different body sizes. The present invention also relates to a front wheel driving mechanism which provides an additional driving mechanism to drive the front wheel by manual operation.

2. Description of the Related Art

A significant problem for cyclists is that, when buying a bicycle, he/she has to try a considerable number of bicycles to see if the positions of the handles are suitable to him/her. In some occasions, the positions of the handles of a certain bicycle may be suitable, yet the buyers may not like the pattern of the bicycle.

The present invention is intended to provide a front wheel frame assembly for bicycles which mitigates and/or obviates the above problems.

SUMMARY OF THE INVENTION

The present invention provides a front wheel frame assembly for a bicycle including a front fork rotatably extended through a head tube, a stem securely attached to an upper end of the front fork to rotate therewith. The front wheel frame assembly comprises:

an upper horizontal shaft fixedly mounted to the stem, a lower horizontal shaft fixedly mounted to the front fork, a horizontal tubular member mounted in front of the head tube, two upper supporting rods extending downwardly from the tubular member, each upper supporting rod having a first screw rod formed on a lower end thereof, a shaft being extended through the tubular member and having two ends, a crank member being securely attached to each of the two ends of the shaft to move therewith, and a handle being securely attached to each crank member to move therewith, a vertical rod assembly including two vertical tubes each having a screw hole defined therein, an upper end of each vertical tube being threadedly engaged with the first screw rod, the vertical rod assembly further including a pair of lower supporting rods each having a lower end adapted to be securely mounted on a front hub of the bicycle, each lower supporting rod further including a second screw rod on an upper end thereof for threadedly engaging with a lower end of the screw hole of the vertical tube, whereby an overall length of the vertical rod assembly is adjusted upon rotation of the vertical tubes, and a horizontal rod assembly mounted between the tubular member and the head tube and adjustable in a length thereof.

The horizontal rod assembly includes an upper rod assembly and a lower rod assembly. The upper rod assembly includes at least one upper screw rod subassembly having a first end pivotally mounted to the shaft and a second end pivotally mounted to the upper horizontal shaft, the upper screw rod subassembly being adjustable in a length thereof. The lower rod assembly includes at least one lower screw rod subassembly having a first end pivotally mounted to the shaft and a second end pivotally mounted to the lower horizontal shaft, the lower screw rod subassembly being adjustable in a length thereof.

Preferably, a first nut is mounted around the first screw rod and a second nut is mounted around the second screw rod to position the vertical tube after the adjustment of the length of the vertical rod assembly is accomplished.

In a preferred embodiment of the invention, the upper screw rod subassembly includes a first rod section having a first end pivotally mounted to the shaft and a threaded hole defined in a second end thereof, a second rod section having a threaded screw hole defined in a first end thereof and a second end pivotally mounted to the upper horizontal shaft, and a third screw rod threadedly engaged between the second end of the first rod section and the first end of the second rod section, whereby an overall length of the upper screw rod subassembly is adjusted upon rotation of the third screw rod. Preferably, two further nuts are mounted on the third screw rod to position the third screw rod after adjustment is accomplished.

In a preferred embodiment of the invention, the lower screw rod subassembly includes a first rod section having a first end pivotally mounted to the shaft and a threaded hole defined in a second end thereof, a second rod section having a threaded screw hole defined in a first end thereof and a second end pivotally mounted to the lower shaft, and a further screw rod threadedly engaged between the second end of the first rod section and the first end of the second rod section, whereby an overall length of the lower screw rod subassembly is adjusted upon rotation of the further screw rod. Preferably, two further nuts are mounted on the further screw rod to position the further screw rod after adjustment is accomplished.

A braking member is mounted to at least one of the handles to control a braking cable, and a spring tube is provided around the braking cable to prevent winding of the braking cable during rotational movement of the handles.

The shaft is rotatably extended through the tubular member and further comprises a chain wheel mounted on the shaft to rotate therewith, a lower gear mounted to the front hub, and a chain wound around the chain wheel and the lower gear such that rotational movement of the chain wheel causes rotational movement of the front wheel.

The front wheel frame assembly further comprises means for releasably engaging with the chain wheel. In a preferred embodiment of the invention, the means for releasably engaging with the chain wheel includes:

an actuating plate pivotally connected to one of the supporting tubes and having a first end and a second end, a stop member being mounted to the first end of the actuating plate, a control member mounted on one of the handles, a cable having a first end connected to the second end of the actuating plate and a second end connected to the control member, wherein the stop member is disengaged from the chain wheel to allow rotation of the chain wheel when the control member is in a first position, and the stop member is engaged with the chain wheel to prevent rotation of the chain wheel when the control member is in a second position.

Other objects, advantages, and novel features of the invention will become more apparent from the following detailed description when taken in conjunction with the accompanying drawings.

DESCRIPTION OF THE PREFERRED EMBODIMENT

Figure 1:
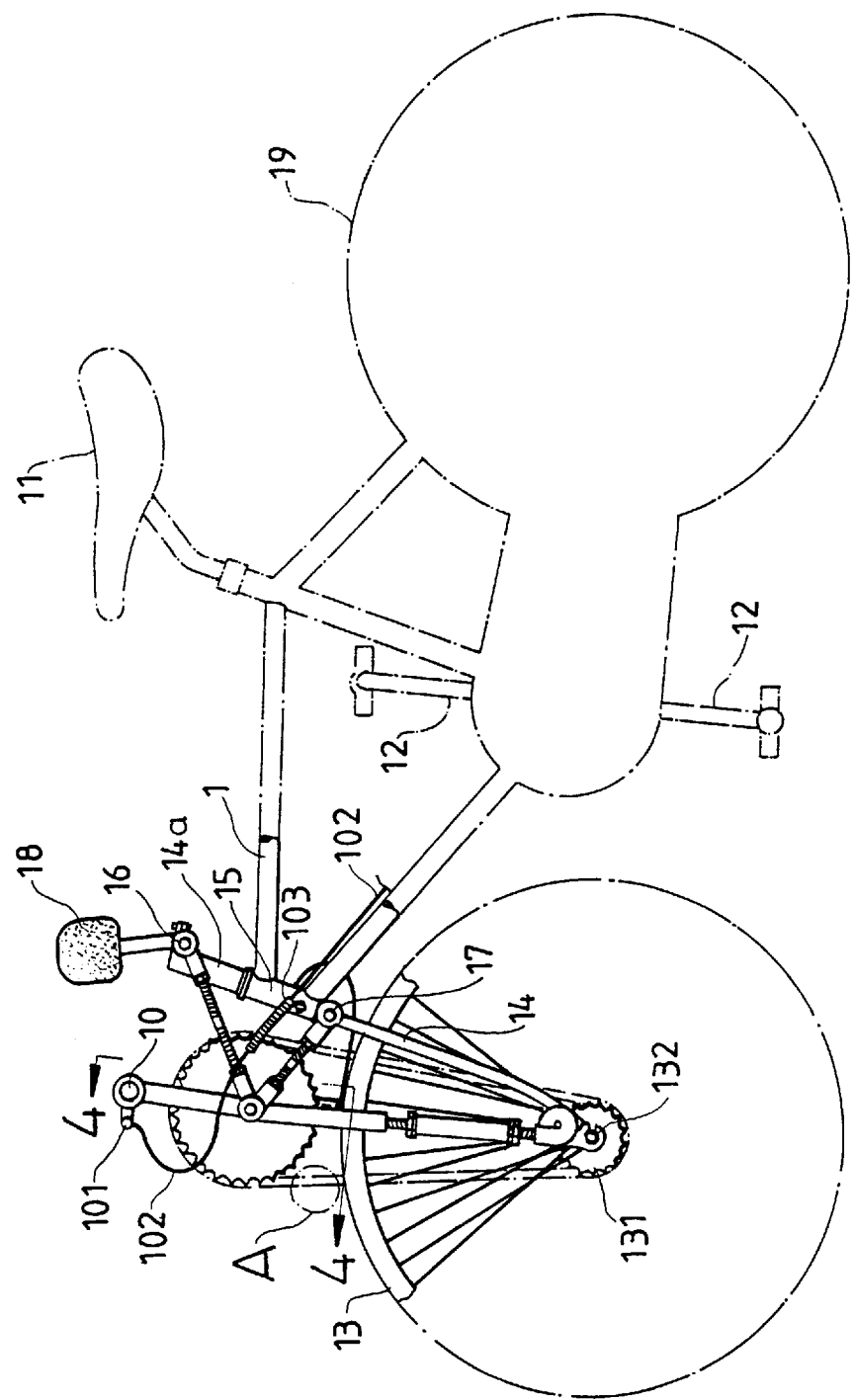
FIG. 1 is a schematic side elevational view of a bicycle with a front wheel driving mechanism in accordance with the present invention.

Referring to the drawings and initially to FIG. 1, a bicycle generally includes a frame 1, a seat 11, a rear wheel 19, a front wheel 13, a pair of pedals 12, and a head tube 15.

A front fork 14 is rotatably extended through the head tube 15 and includes a front fork tip to which the front wheel 13 is mounted. A stem 14a is securely attached to an upper end of the front fork 14 to rotate therewith, and a pad 18 is mounted to the stem 14a so that the cyclist may rest his/her chest on the pad 18 during cycling. In addition, an upper horizontal shaft 16 is mounted to the stem 14a while a lower horizontal shaft 17 is mounted to the front fork 14.

Figure 2:
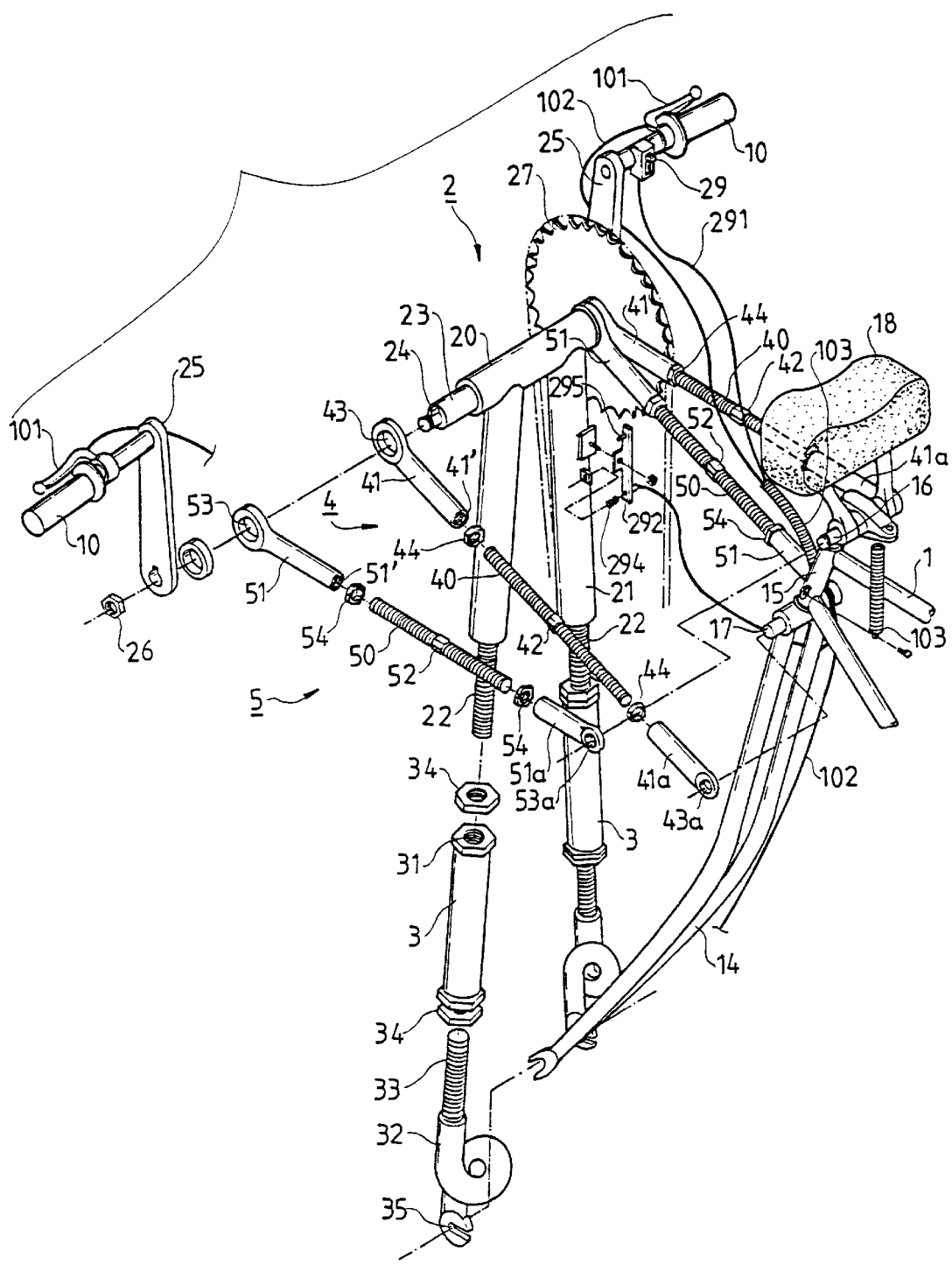
FIG. 2 is an exploded perspective view of the front wheel driving mechanism in accordance with the present invention.

Still referring to FIG. 1 and further to FIG. 2, a front wheel frame assembly in accordance with the present invention generally comprises a main frame 2, a vertical tube assembly, an upper rod assembly 4, and a lower rod assembly 5. The main frame 2 includes a horizontal tubular member 20 mounted in front of the head tube 15 and two supporting rods 21 extending downwardly from the tubular member 20. The rods 21 are properly spaced so that the front wheel 13 may rotate therebetween. A screw rod 22 is formed on a lower end of each rod 21. A driving shaft 23 is rotatably extended through the tubular member 20, and a crank member 25 is securely attached to each of two ends of the shaft 23 to rotate therewith. In this embodiment, the crank member 25 includes a notch (not labeled) to fittingly receive a key 24 on the end of the shaft 23. A handle 10 is securely attached to each crank member 25 to move therewith. A braking member 101 is mounted to the handle 10 and a braking cable 102 controlled by the braking member 101 is extended through a spring tube 103 so as to prevent undesired winding of the braking cable 102 during rotational movement of the handle.

Figure 3:
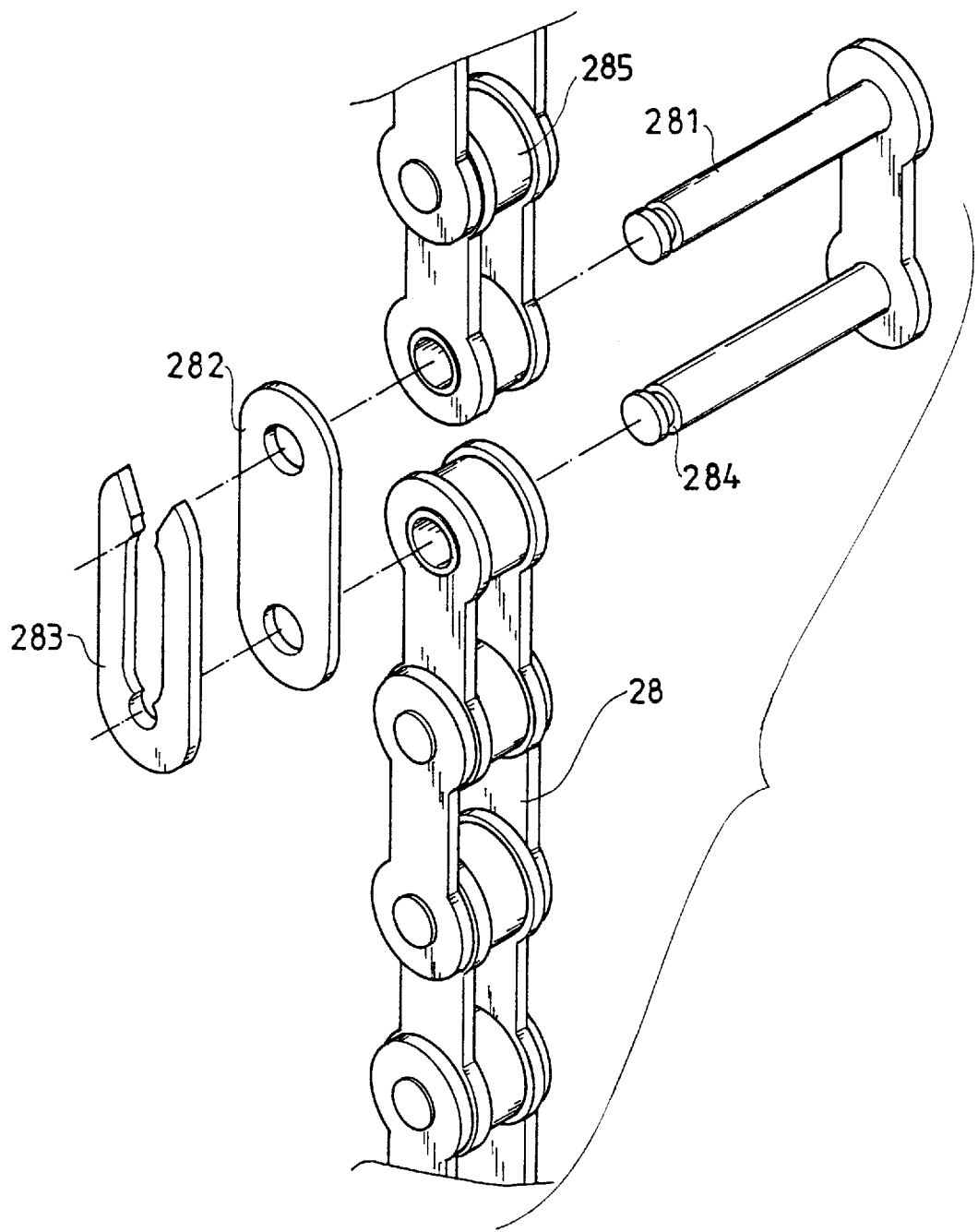
FIG. 3 is an exploded view of a circle "A" in FIG. 1, illustrating a portion of a chain of the front wheel driving mechanism.

A chain wheel 27 is mounted on the shaft 23 to rotate therewith, a lower gear 131 is mounted to a front hub 132 for the front wheel 13, and a chain 28 is wound around the chain wheel 27 and the lower gear 131 such that rotational movement of the chain wheel 27 causes rotational movement of the front wheel 13. Referring to FIG. 3, the chain 28 includes a plurality of rollers 285, a plurality of chain plates 282 mounted on outer sides of the rollers, a plurality of connecting pins 281, and a plurality of securing plates 283 removably engaged with grooves 284 defined in the connecting pins 281, thereby allowing adjustment of the length of the chain 28.

Figure 4:
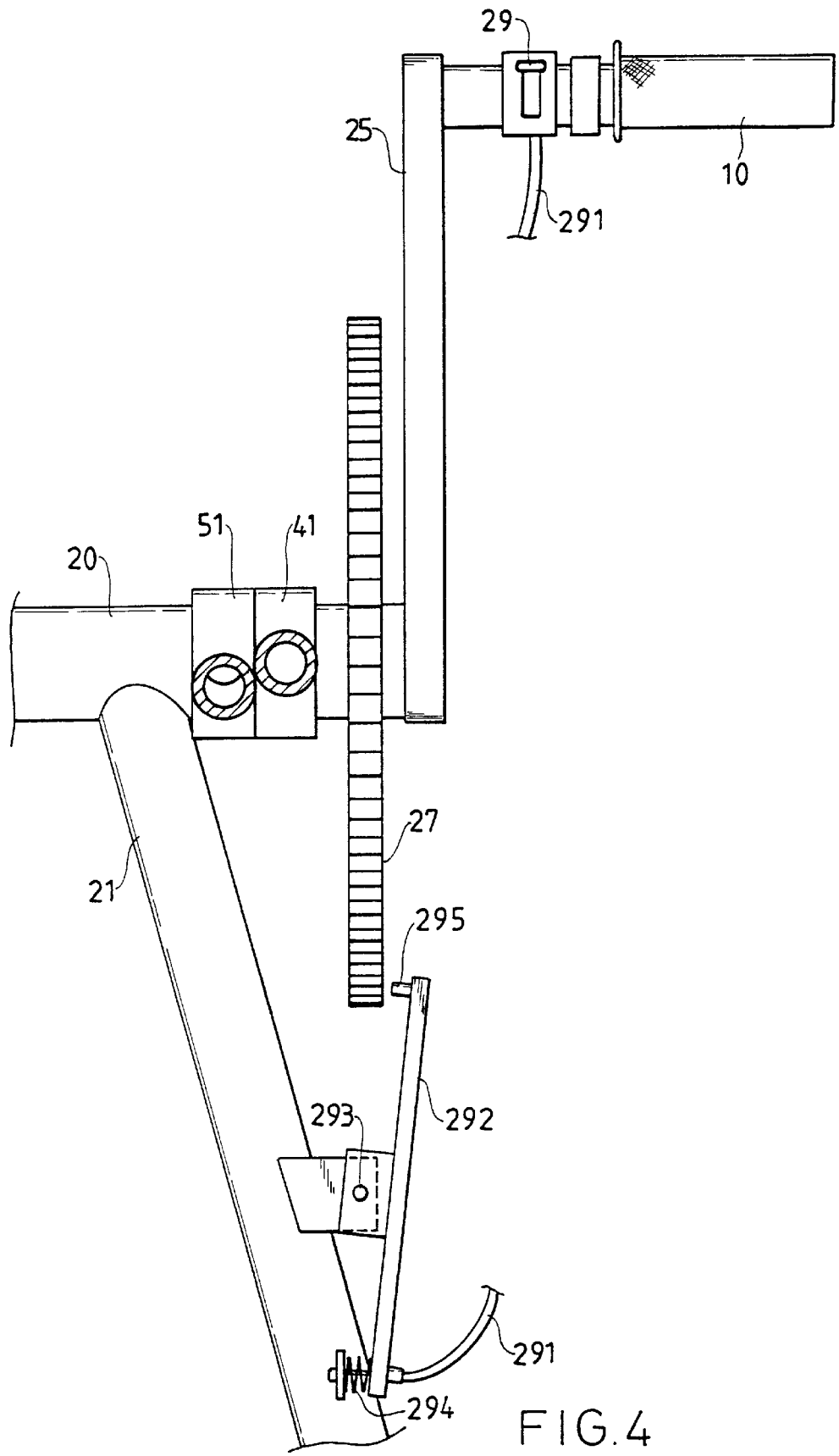
FIG. 4 is a schematic sectional view taken along line 4—4 in FIG. 1, illustrating a portion of the front wheel driving mechanism in which the chain is rotatable.
Figure 5:
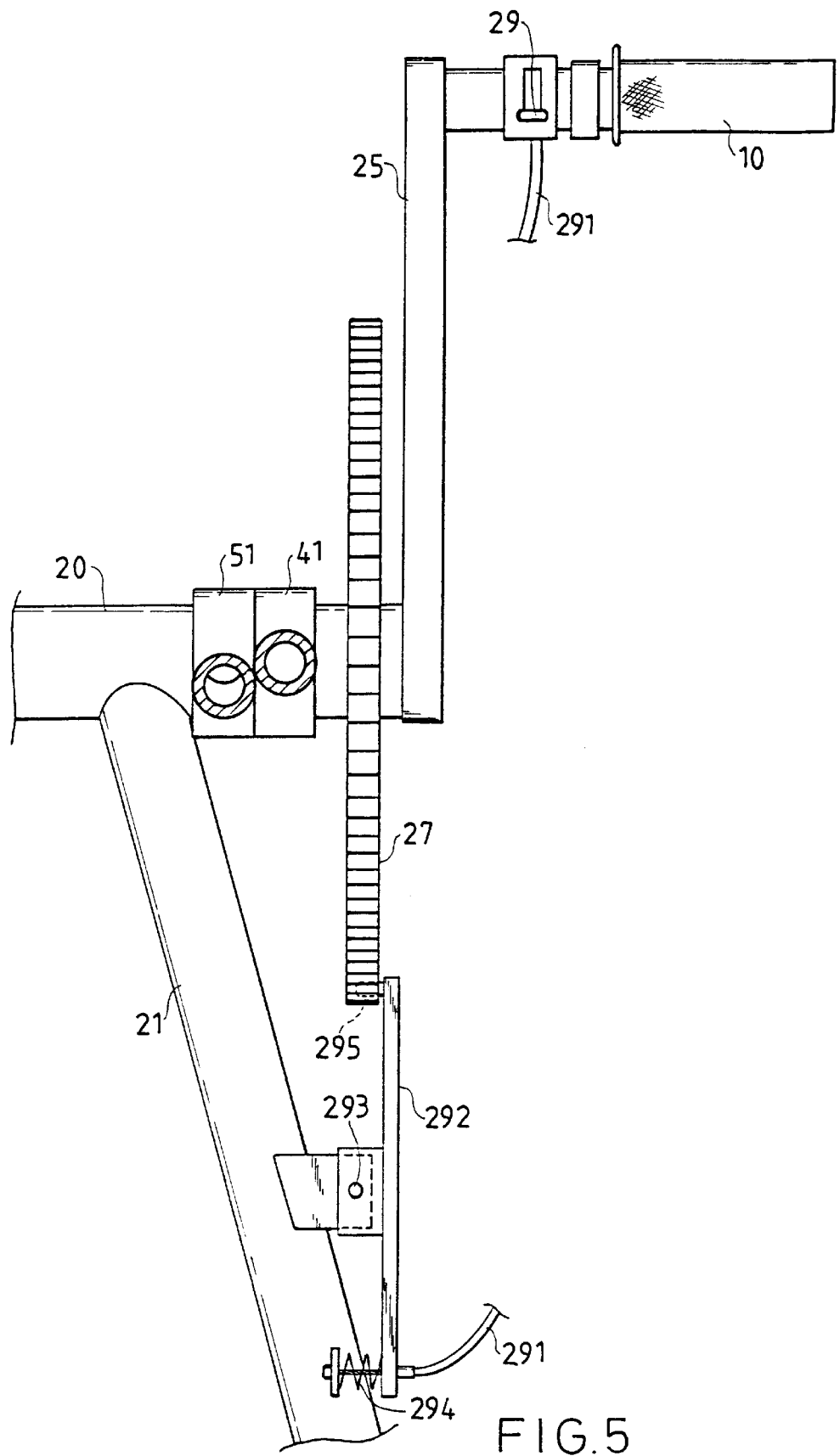
FIG. 5 is a view similar to FIG. 4, in which the chain is fixed.

Referring to FIG. 4, an actuating plate 292 is pivotally connected to one of the supporting tubes 21 at 293 and includes a stop member 295 at a first end thereof. A cable 291 has a first end connected to a second end of the actuating plate 292 and a second end connected to a control member 29, which, in turn, is mounted to one of the handle 10. The stop member 295 is releasably engaged with the chain wheel 27. The chain wheel 27 in FIG. 4 is rotatable since the stop member 295 is outside the chain wheel 27. When the control member 29 is switched to a position shown in FIG. 5, the actuating plate 292 is pivoted such that the stop member 295 engages with the chain wheel 27 and thus prevents rotation of the chain wheel 27. A spring 294 is provided to the second end of the actuating plate 292 to return the actuating plate 292 to its original position in FIG. 4 when the control member 29 is switched to a position shown in FIG. 4.

Referring back to FIG. 2, the vertical rod assembly includes two vertical tubes 3 each having a screw hole 31 defined therein. An upper end of each vertical tube 3 is threadedly engaged with the screw rod 22, and a nut 34 is mounted around the screw rod 22. The vertical rod assembly further includes a pair of lower supporting rods 32 each including a hole or slot 35 defined in a lower end thereof so as to be mounted on the front hub 132. Each lower supporting rod 32 further includes a screw rod 33 on an upper end thereof for threadedly engaging with a lower end of the screw hole 31 of the vertical tube 3. In addition, a further nut 34 is mounted around the screw rod 33. Upon rotation of the vertical tubes 3, an overall length of the screw rod 22, the vertical tube 3, and the lower supporting tube 32 can be adjusted. After adjustment, the nuts 34 are rotated to achieve the positioning effect, i.e., to prevent rotation of the vertical tube 3. Preferably, the upper portion and lower portion of the screw hole 3 may have different leads. Preferably, the lower end of each lower supporting rod 32 may have a U-turn (FIG. 2) to absorb shocks.

Still referring to FIG. 2, the upper rod assembly 4 includes two upper screw rod subassemblies each having a first end pivotally mounted to the shaft 23 and a second end pivotally mounted to the upper shaft 16. Each upper screw rod subassembly is adjustable in a length thereof. In this embodiment, each upper screw rod subassembly includes a first rod section 41 having a first end 43 pivotally mounted to the shaft 23 and a threaded hole 41' defined in a second end thereof, a second rod section 41a having a threaded screw hole (see 41') defined in a first end thereof and a second end 43a pivotally mounted to the upper shaft 16, and a screw rod 40 threadedly engaged between the second end of the first rod section 41 and the first end of the second rod section 41a. Upon rotation of the screw rod 40 at 42, an overall length of the upper screw rod subassembly is adjusted. The screw hole 41' in the second end of the first rod section 41 and the screw hole in the first end of the second rod section 41a have different leads such that rotation of the screw rod 40 may lengthen or shorten the length of the upper screw rod subassembly. Two nuts 44 are mounted on the screw rod 40 to achieve the positioning effect after adjustment is accomplished.

Still referring to FIG. 2, the lower rod assembly 5 includes two lower screw rod subassemblies each having a first end pivotally mounted to the shaft 23 and a second end pivotally mounted to the lower shaft 17. Each lower screw rod subassembly is adjustable in a length thereof. In this embodiment, each lower screw rod subassembly includes a first rod section 51 having a first end 53 pivotally mounted to the shaft 23 and a threaded hole 51' defined in a second end thereof, a second rod section 51a having a threaded screw hole (see 51') defined in a first end thereof and a second end 53a pivotally mounted to the lower shaft 17, and a screw rod 50 threadedly engaged between the second end of the first rod section 51 and the first end of the second rod section 51a. Upon rotation of the screw rod 50 at 52, an overall length of the lower screw rod subassembly is adjusted. The screw hole 51' in the second end of the first rod section 51 and the screw hole in the first end of the second rod section 51a have different leads such that rotation of the screw rod 50 may lengthen or shorten the length of the lower screw rod subassembly. Two nuts 54 are mounted on the screw rod 50 to achieve the positioning effect after adjustment is accomplished.

Figure 6:
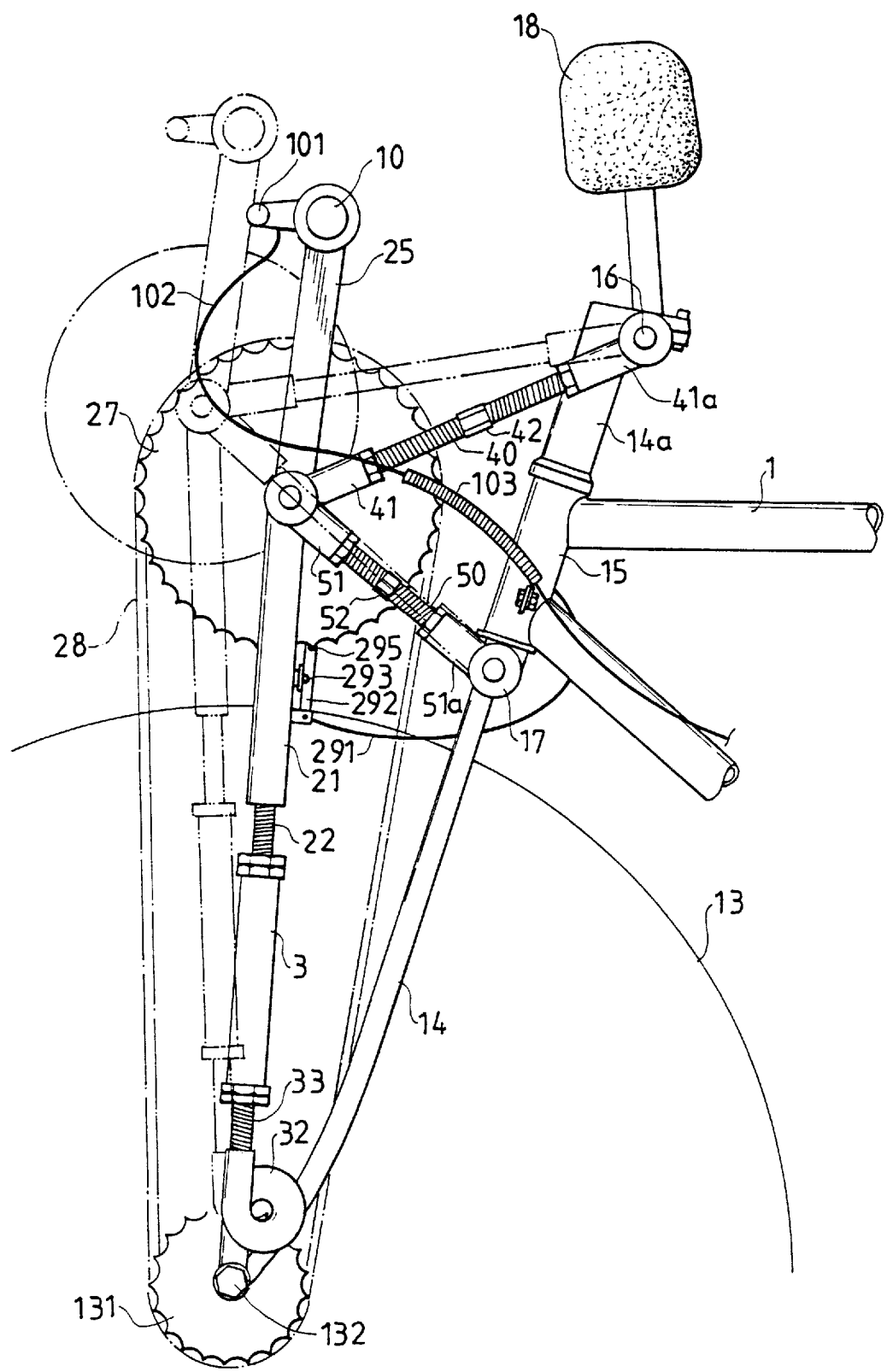
FIG. 6 is a schematic side elevational view illustrating adjustment of the front wheel driving mechanism.

Referring to FIG. 6, when the cyclist finds that the handles are too far or too close for him/her, he/she may adjust the upper and lower screw rod subassemblies to adjust the distance between the handles 10 and him/her. When the cyclist finds that the handles are too high or too low for him/her, he/she may adjust the vertical tube assembly 3 to adjust the height of the handles.

It is appreciated that use of a single rod assembly (the upper rod assembly 4 or the lower rod assembly 5 having only one screw rod subassembly) may achieve the same function. It is further appreciated that the driving mechanism of the present invention provides an additional mechanism for driving the front wheel 13 by hands.

Although the invention has been explained in relation to its preferred embodiment, it is to be understood that many other possible modifications and variations can be made without departing from the spirit and scope of the invention as hereinafter claimed.

What is claimed is:

1. The combination of a front wheel frame assembly and a bicycle including front fork rotatably extended through a head tube, a stem securely attached to an upper end of the front fork to rotate therewith, the front wheel frame assembly comprising:

an upper horizontal shaft fixedly mounted to the stem, a lower horizontal shaft fixedly mounted to the front fork, a horizontal tubular member mounted in front of the head tube, two upper supporting rods extending downwardly from the tubular member, each said upper supporting rod having a first screw rod formed on a lower end thereof, a forward shaft being extended through the tubular member and having two ends, a crank member being securely attached to each of the two ends of the forward shaft to move therewith, and a handle being securely attached to each said crank member to move therewith, a vertical rod assembly including two vertical tubes each having a screw hole defined therein, an upper end of each said vertical tube being threadedly engaged with one or the other of the first screw rods, the vertical rods assembly further including a pair of lower supporting rods each having a lower end adapted to be securely mounted on a front hub of the bicycle, each said lower supporting rod further including a second screw rod on an upper end thereof for threadedly engaging with a lower end of the screw hole of one or the other of the vertical tubes, whereby an overall length of the vertical rod assembly is adjusted upon rotation of the vertical tubes, and a horizontal rod assembly mounted between the tubular member and the head tube and adjustable in length thereof.

2. A front wheel frame assembly according to claim 1, wherein the horizontal rod assembly includes:

an upper rod assembly including at least one upper screw rod subassembly having a first end pivotally mounted to the forward shaft and a second end pivotally mounted to the upper horizontal shaft, said upper screw rod subassembly being adjustable in a length thereof, and a lower rod assembly including at least one lower screw rod subassembly having a first end pivotally mounted to the forward shaft and a second end pivotally mounted to the lower horizontal shaft, the lower screw rod subassembly being adjustable in a length thereof.

3. A front wheel frame assembly according to claim 2, further comprising a first nut mounted around the first screw rod and a second nut mounted around the second screw rod to position the vertical tube after the adjustment of the length of the vertical rod assembly is accomplished.

4. A front wheel frame assembly according to claim 2, wherein said upper screw rod subassembly includes a first rod section having a first end pivotally mounted to the forward shaft and a threaded hole defined in a second end thereof, a second rod section having a threaded screw hole defined in a first end thereof and a second end pivotally mounted to the upper horizontal shaft, and a third screw rod threadedly engaged between the second end of the first rod section and the first end of the second rod section, whereby an overall length of the upper screw rod subassembly is adjusted upon rotation of the third screw rod.

5. A front wheel frame assembly according to claim 4, further comprising two further nuts mounted on the third screw rod to position the third screw rod after adjustment is accomplished.

6. A front wheel frame assembly according to claim 5, wherein said lower screw rod subassembly includes a first rod section having a first end pivotally mounted to the forward shaft and a threaded hole defined in a second end thereof, a second rod section having a threaded screw hole defined in a first end thereof and a second end pivotally mounted to the lower shaft, and a third screw rod threadedly engaged between the second end of the first rod section and the first end of the second rod section, whereby an overall length of the lower screw rod subassembly is adjusted upon rotation of the third screw rod.

7. A front wheel frame assembly according to claim 6, further comprising two further nuts mounted on the third screw rod to position the third screw rod after adjustment is accomplished.

8. A front wheel frame assembly according to claim 1, further comprising a braking member mounted to at least one of the handles, a braking cable controlled by the braking member, and a spring tube through which the braking cable is extended to prevent winding of the braking cable during rotational movement of the handles.

9. A front wheel frame assembly according to claim 1, wherein the forward shaft is rotatably extended through the tubular member and further comprises a chain wheel mounted on the forward shaft to rotate therewith, a lower gear mounted to the front hub, and a chain wound around the chain wheel and the lower gear such that rotational movement of the chain wheel causes rotational movement of the front wheel.

10. A front wheel frame assembly according to claim 9, further comprising means for releasably engaging with the chain wheel.

11. A front wheel frame assembly according to claim 10, wherein the means for releasably engaging with the chain wheel includes:

an actuating plate pivotally connected to one of the supporting tubes and having a first end and a second end, a stop member being mounted to the first end of the actuating plate, a control member mounted on one of the handles, a cable having a first end connected to the second end of the actuating plate and a second end connected to the control member, wherein the stop member is disengaged from the chain wheel to allow rotation of the chain wheel when the control member is in a first position, and the stop member is engaged with the chain wheel to prevent rotation of the chain wheel when the control member is in a second position.

* * * * *